United States Patent
Alt et al.

(10) Patent No.: US 7,011,806 B2
(45) Date of Patent: Mar. 14, 2006

(54) SPRAY DRYING PROCESS FOR PRODUCING ANHYDROUS ALKALI SULFIDE

(75) Inventors: Hans Christian Alt, Gelnhausen-Meerholz (DE); Andreas Gölz, Rodenbach (DE); Alfred Alig, Geiselbach-Omersbach (DE)

(73) Assignee: Degussa AG, Düsseldorf (DE)

( * ) Notice: Subject to any disclaimer, the term of this patent is extended or adjusted under 35 U.S.C. 154(b) by 123 days.

(21) Appl. No.: 10/714,382

(22) Filed: Nov. 14, 2003

(65) Prior Publication Data

US 2004/0109818 A1 Jun. 10, 2004

(30) Foreign Application Priority Data

Dec. 4, 2002 (DE) .......................... 102 56 531

(51) Int. Cl.
*C01B 17/38* (2006.01)

(52) U.S. Cl. .................................... 423/566.2
(58) Field of Classification Search .............. 423/566.2; 23/302 R, 302 T; 264/117
See application file for complete search history.

(56) References Cited

U.S. PATENT DOCUMENTS

| | | | | |
|---|---|---|---|---|
| 1,946,089 A | * | 2/1934 | Mayers ..................... | 423/566.2 |
| 3,316,309 A | | 4/1967 | Mann et al. | |
| 3,786,035 A | * | 1/1974 | Scoggin ................... | 423/566.2 |
| 6,503,474 B1 | * | 1/2003 | Magiera et al. .......... | 423/566.2 |

FOREIGN PATENT DOCUMENTS

| | | |
|---|---|---|
| EP | 0 924 165 A1 | 6/1999 |
| WO | WO01/25146 A2 | 4/2001 |

OTHER PUBLICATIONS

Definition of "Inert gas", from "Wikipedia, the free encyclopedia", courtesy of http://en.wikipedia.org/wiki/Inert_gas, last modified Aug. 29, 2004.*

Perry's Chemical Engineers' Handbook, Sixth Edition. New York, McGraw–Hill Book Company, 1984. pp. 20–1, 20–2, & 20–54 through 20–58, including Table 20–29.*

Andersson, Jan Y. et al., "Mechanisms and Kinetics of the Thermal Decomposition of Sodium Sulphide Pentahydrate under controlled Water Vapour Pressure," Journal of the Chemical Society, 1986, pp. 469–475, Dalton Transactions, Chemical Society, Letchworth, GB.

* cited by examiner

*Primary Examiner*—Stanley S. Silverman
*Assistant Examiner*—Ardith E. Hertzog
(74) *Attorney, Agent, or Firm*—Smith, Gambrell & Russell, LLP

(57) ABSTRACT

A process and a device for producing anhydrous alkali sulfide, wherein an alkali sulfide solution, alkali sulfide suspension, alkali sulfide dispersion or alkali water of crystallization melt is dried by spray drying with inert drying gas loaded with water vapor.

3 Claims, 2 Drawing Sheets

SPRAY DRYING PROCESS FOR PRODUCING ANHYDROUS ALKALI SULFIDE

INTRODUCTION AND BACKGROUND

The present invention relates to a process for producing anhydrous alkali sulfide.

In the dry state and when finely dispersed, alkali sulfides can react with air at elevated temperature, giving rise to considerable potential risk and product losses during thermal drying. This represents a major processing and safety obstacle to the performance of such a process.

The production of anhydrous alkali sulfide by vacuum contact drying, starting from the solid containing water of crystallization, is known from EP 0 924 165 A1.

Furthermore, the convective spray drying of anhydrous alkali sulfides using hot, anhydrous inert gases, is known from WO 01/25146.

The disadvantage of the known processes using anhydrous inert gases, such as e.g. nitrogen, as the drying gas in a pass-through operation lies in the high operating costs. Gas recycling is therefore desirable. However, recycled gas may no longer be entirely anhydrous and therefore has to be dried.

An object of the present invention is to provide a process wherein a gas recycling operation is possible without drying the gas.

SUMMARY OF THE INVENTION

According to the present invention, a process is carried out for producing anhydrous alkali sulfide, by drying an alkali sulfide solution, alkali sulfide suspension, alkali sulfide dispersion or alkali sulfide water of crystallisation melt by spray drying with inert drying gas loaded with water vapour.

The inert drying gas used in accordance with the present invention is nitrogen, helium, argon or a mixture of the cited gases. The inert drying gas loaded with water vapour can be pure superheated water vapour. The water vapour load in the inert drying gas loaded with water vapour can be greater than 1 g/kg (dew point above −15° C.), preferably greater than 5 g/kg (dew point above 5° C.), particularly preferably greater than 15 g/kg (dew point above 20° C.).

The alkali sulfide used according to this invention can be alkali sulfide, alkali hydrogen sulfide or alkali polysulfide.

The alkali sulfide solution, alkali sulfide suspension, alkali sulfide dispersion or alkali sulfide water of crystallization melt can be sprayed in a chamber with a solids content of 10 wt. %<$x_{solids}$<95 wt. %, preferably 20 wt. %<$x_{solids}$<70 wt. %, particularly preferably 40 wt. %<$x_{solids}$<70 wt. %.

The alkali sulfide solution can be a solution of alkali sulfide in water. For example, $Na_2S*xH_2O$ ($3 \leq x \leq 9$) can be used as the alkali sulfides.

The anhydrous alkali sulfide produced by the process according to the invention has a residual water content of less than 10.0 wt. %, preferably less than 3.0 wt. %, particularly preferably less than 1.5 wt. %.

In the spray drying process a liquid substance preparation (solution, suspension, dispersion or melt of alkali sulfide), hereinafter referred to as dryer feed, can be atomized inside the process chamber and brought into contact with a hot gas stream. In this way the solvent can be entirely or partially evaporated and a waste-gas stream consisting of the drying gas, the solids particles and the vaporous solvent is formed. The solid can then be separated from the waste-gas stream.

The amount of energy supplied to or removed from the system can be proportional to the drying gas stream. The drying gas stream and the drying gas inlet temperature can be increased in order to raise the process throughput.

Centrifugal atomizers or nozzles can be used to spray or atomize the dryer feed in the process chamber. One or more substances can be fed through the nozzles simultaneously. They can take the form of pressure nozzles or pneumatic atomizers. If pressure nozzles are used, only the pressurized dryer feed can be sprayed. If on the other hand pneumatic atomizers are used, atomizing gas and nozzle cleaning gas can be sprayed in addition to the liquid substances. The technical design of the nozzles or the direction of flow through the nozzles into the process chamber can in principle be freely chosen and depends on the product. The maximum number of substances that can be fed through a nozzle should in no way restrict the drying of alkali sulfides. The auxiliary gas used for atomization can be a low-oxygen inert gas containing less than 0.1 vol. %, preferably less than 0.05 vol. %, oxygen, or an oxygen-free inert gas.

The solvent can be evaporated by heat transfer from the drying gas to the wet particles.

As it passes through the process chamber, the drying gas can absorb evaporating solvent and remove it from the process. The spray drying can be performed continuously or in batches. In the gas recycling operation a split stream of the recycled gas can preferably be used cyclically.

BRIEF DESCRIPTION OF DRAWINGS

The present invention will be further understood with reference to the accompanying drawings, wherein.

DETAILED DESCRIPTION OF INVENTION

Figure 1:
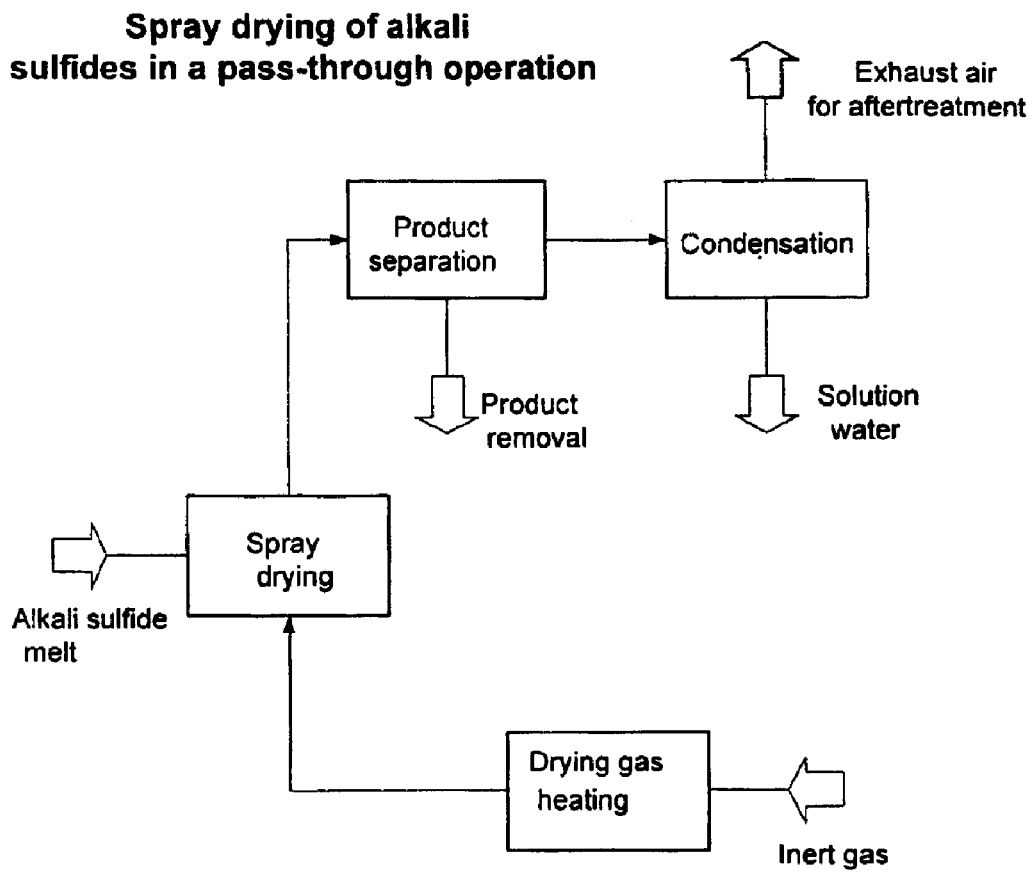
FIG. 1 is a schematic flow diagram of the spray drying of alkali sulfides in a pass-through process.

The process according to the invention can be performed in a pass-through operation as shown in FIG. 1.

In the pass-through operation, inert gas can be heated as the drying gas. The drying gas can preferably be a low-oxygen gas containing less than 0.1 vol. %, preferably less than 0.05 vol. %, oxygen or an oxygen-free gas. The drying gas heaters can be operated electrically, with steam or with heat transfer media. A combination of drying gas heaters may be convenient in order to run the drying plant economically.

The drying gas can then be used to spray dry the dryer feed. The spray drying can be performed under excess pressure, normal pressure or partial vacuum. A favourable process pressure range can exist if powder conforming to specification is produced with the drying gas at the maximum permissible system temperature and at maximum capacity. Since the introduction of oxygen into the system must be avoided, the plant can preferably be operated under normal pressure or slight overpressure of Δp=0 to 200 mbar above ambient pressure. The heated drying gas inside the process chamber can display a temperature of 250° to 800° C., such that the solvent evaporates when the dryer feed (alkali sulfide melt) comes into contact with the drying gas.

Product separation can then take place with discharge of the product. The product stream can be separated from the waste-gas stream by suitable means, for example using filters or cyclones, optionally cooled and if necessary stored under a protective gas atmosphere or packed. If surface filters with pressure surge cleaning are used for dust collection, cleaning can be performed with any oxygen-free gas, but preferably with preheated inert gas or a split stream of the drying gas.

The solvent can be condensed and the exhaust air aftertreated.

In the pass-through operation fresh drying gas is repeatedly fed into the process chamber and the exhaust gas leaving the process chamber discarded.

Figure 2:
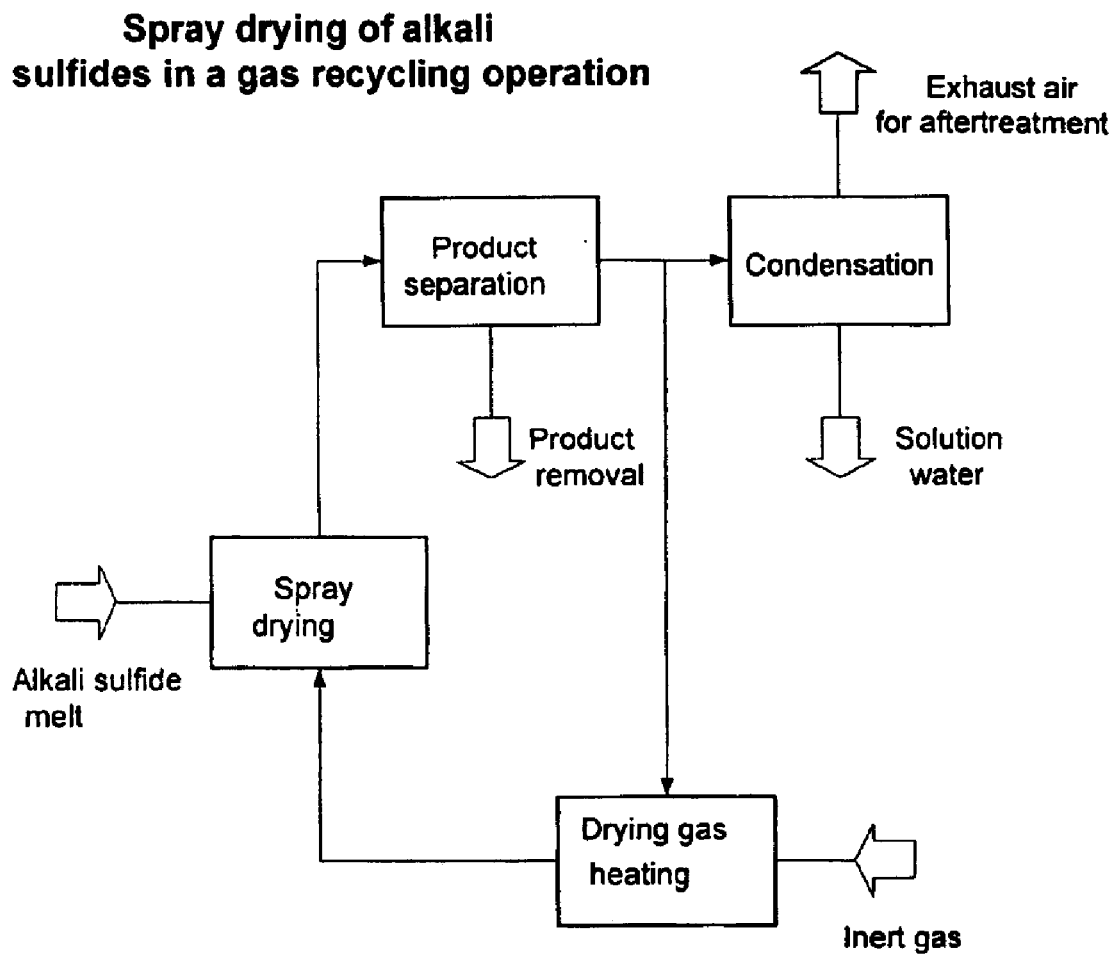
FIG. 2 is a schematic flow diagram of the spray drying of alkali sulfide in a gas recycling process.

The process according to the invention also can be performed in a gas recycling operation as shown in FIG. 2. The difference from the pass-through operation is that the exhaust gas can be recycled and conditioned by energy input in such a way that it can be used again as the drying gas. During conditioning, the liquid components evaporated in the process chamber can be partially removed from the exhaust gas such that they too can be recycled. As complete as possible a gas recycling with removal of the excess solvents and inert gases is desirable from an economic perspective.

In the gas recycling operation the solvent vapours can gradually accumulate in the pure inert gas that is used. After some time an equilibrium drying gas composition can become established, which is determined by the proportion of inert gas additionally introduced and the proportion of evaporating solvents.

The water vapour-containing exhaust gas can be discarded or the water vapour preferably condensed and the gas conditioned again for use as the drying gas.

In the preferred process as shown in FIG. 2, which avoids the additional introduction of inert gases into the ongoing process, drying can take place in stationary operation in pure superheated water vapour, whereby the quantity of water sprayed in the process chamber can be removed. With this mode of operation an aftertreatment of the possibly odorous exhaust gas can be avoided altogether.

The alkali sulfides produced with the process according to the invention can display an average of the particle size distributions generated of 15 $\mu$m to 800 $\mu$m, preferably 20 $\mu$m to 300 $\mu$m, particularly preferably 30 $\mu$m to 150 $\mu$m, and can be in powdered form.

As a consequence of the preferable avoidance of the use of inert gases in stationary operation, no pollutant-containing exhaust gas, which would be difficult to clean, can be formed.

The advantage of the process according to the invention is that the recycled gas does not have to be dried and so the operating costs and hence the production costs are lower. A safe plant operation is therefore possible in this way without the consumption of expensive, oxygen-free inert gases.

The invention also provides a device for performing the process according to the invention, which comprises the following components:

a drying chamber, an atomizing device introduced into this chamber for the dryer feed, a solids separation system connected to the chamber via this discharge outlet and containing an exhaust air pipe optionally fitted with a filter unit to remove the gas stream, a plant for recovering the solvent from the waste-gas stream and a recycling and conditioning apparatus for at least partial recycling and conditioning of the exhaust gas for renewed use as the drying gas (gas recycling operation).

The process of the present invention can be used to prepare any suitable anhydrous alkali sulfide and most commonly sodium and potassium sulfide will be formed.

EXAMPLES $Na_2S \cdot 3H_2O$ is melted in a glass vessel at a temperature of 120° C. The resulting melt has a water content of approximately 41 wt. %. A gear pump is used to convey the melt to the dryer. The melt is sprayed into the dryer using a two-fluid nozzle (Schlick 970-S4) with a nozzle diameter of 1.2 mm. The nozzle is operated with a gas pressure of 3 bar and an atomizing gas flow rate of 4.5 $m^3/h$.

The spray dryer used consists of a drying chamber with a diameter of 150 mm and a height of 830 mm. The cylindrical part thereof measures 630 mm and the conical part 200 mm. A cyclone with a diameter of 80 mm and a height of 300 mm together with a filter are connected in series to separate the product. A water-operated washer is used for additional cleaning of the exhaust gas stream.

The drying gas is heated using an electric gas heater. Nitrogen and water vapour from the water distribution system are used as the drying gas. The water vapour is depressurized from 10 bar to atmospheric pressure, passed through a condensation separator and then superheated. The drying gas is fed at a temperature of 600° C. into the drying chamber, where it comes into contact with the sprayed melt and evaporates the solvent (water of crystallization). Drying takes place at an exhaust gas temperature of between 100 and 350° C., the mass flux of the melt controlling the outlet temperature of the drying gas. The gas stream leaving the drying chamber passes through the cyclone and the filter, where the dry solids are separated off. The particle size of the separated solid is between 20 and 120 $\mu$m. Drying is performed with suction. The apparatus components are manufactured from glass and stainless steel.

The setting parameters and residual moisture contents are set out in Table 1.

TABLE 1

| Parameter | Unit | Comparative tests | | | | | | Examples | | | | |
|---|---|---|---|---|---|---|---|---|---|---|---|---|
| Drying gas stream | $m^3/h$ | | | | | | 45 | | | | | |
| Atomizing gas $N_2$ | $m^3/h$ | | | | | | 4.5 | | | | | |
| Inlet temperature | ° C. | | | | | | 600 | | | | | |
| Exhaust gas temperature | ° C. | 100 | 150 | 200 | 250 | 300 | 350 | 150 | 200 | 250 | 300 | 350 |
| Drying gas | | Nitrogen | | | | | | Water vapour | | | | |
| Residual moisture | wt. % | 10.6 | 4.7 | 1.2 | 0.5 | 0.2 | 0.1 | 9.8 | 4.3 | 1.5 | 0.7 | 0.3 |

The examples from the process according to the invention display a residual moisture of below 10 wt. % when water vapour is used as the drying gas.

Determining the Residual Moisture 19.5 g $Na_2S*xH_2O$ is weighed into a 1000 ml measuring flask, dissolved in demineralized water and the flask topped up to the calibration mark. Of this solution either precisely 10 ml are pipetted off or 10.0 g weighed out using a precision balance into a 300 ml Erlenmeyer flask with ground glass stopper and diluted with approximately 90 ml demineralized water from a measuring cylinder. By means of a Metrohm Dosimat 60 ml iodine Solution (0.05 mol/liter) are pipetted in with gentle stirring using a magnetic stirrer, during which process the solution becomes turbid over time due to precipitating sulfur and later turns a brown color due to the excess of iodine solution. As iodometry is a time reaction, the reaction solution is left to stand for 15 minutes at room temperature, during which time it is shaken frequently. It is stored during this time in the closed flask and if possible in the dark, since iodine is volatile and iodide is oxidized to iodine by the introduction of light.

After this reaction time the excess iodine is titrated with a 0.1 n sodium thiosulfate solution. During the titration normal solution is first added until the solution just turns brown due to the iodine present. After addition of 2 ml starch solution (blue color), titration is continued until the color changes and the amount of thiosulfate solution consumed is noted. A triple determination is performed on each dissolved sample.

Calculation

The sodium sulfide reacts with iodine in the molar ratio 1:1. For the titration of 10.0 g of an $Na_2S$ solution obtained from 19.5 g $Na_2S$ (100%) in 1000 ml $H_2O$, exactly 50.0 ml of an iodine solution with c=0.05 mol/liter are used. With an initial quantity of 60.0 ml iodine solution, a further 10.0 ml must be back-titrated with 10.0 ml sodium thiosulfate solution c=0.1 mol/liter. The active ingredient content and then the water content of the $Na_2S$ used are then calculated from the increase in consumption of sodium thiosulfate solution using the formula below:

$$\frac{(V(I_2) - V(Na_2S_2O_3))*0.05 \text{ mol/l} * M(Na_2S)}{\text{Weighed amount of } Na_2S \text{ [g]}} * 100 * 100 =$$

Active ingred. content in wt. %

$V(I_2)$=Initial volume of iodine solution in liters $V(Na_2S_2O_3)$=Consumption of sodium thiosulfate solution in liters $M(Na_2S)$=Molecular weight of sodium sulfide in g/mol $m(Na_2S)$=Weighed amount of $Na_2S$ sample in g Residual moisture in wt. %=100—active ingredient content in wt. %

Further variations and modifications of the foregoing will be apparent to those skilled in the art and are intended to be encompassed by the claims appended hereto.

German priority application 102 56 531.7 is relied on and incorporated herein by reference.

We claim:

1. Process for producing anhydrous alkali sulfide, comprising spray drying a liquid substance preparation selected from the group consisting of an alkali sulfide solution, alkali sulfide suspension, alkali sulfide dispersion and alkali sulfide water of crystallisation melt, into a chamber and atomizing said liquid substance preparation in contact with a hot gas stream consisting of inert drying gas loaded with pure superheated water vapour, and optionally, an inert drying gas, to dry said preparation and thereby produce anhydrous alkali sulfide and recycling exhaust gas without introduction of additional inert gas and drying in pure superheated water vapour.

2. Process for producing anhydrous alkali sulfide according to claim 1, wherein the drying is performed under normal pressure or a slight overpressure of $\Delta p$=0 to 200 mbar above ambient pressure.

3. Process for producing anhydrous alkali sulfide according to claim 1, further comprising recycling the drying gas, without adding additional inert gas in stationary operation and excess water vapour is removed by condensation so that it is free from exhaust gases.

* * * * *